L. R. O'NEILL.
GOVERNOR.
APPLICATION FILED SEPT. 6, 1910.
1,005,570.
Patented Oct. 10, 1911.
2 SHEETS—SHEET 1.
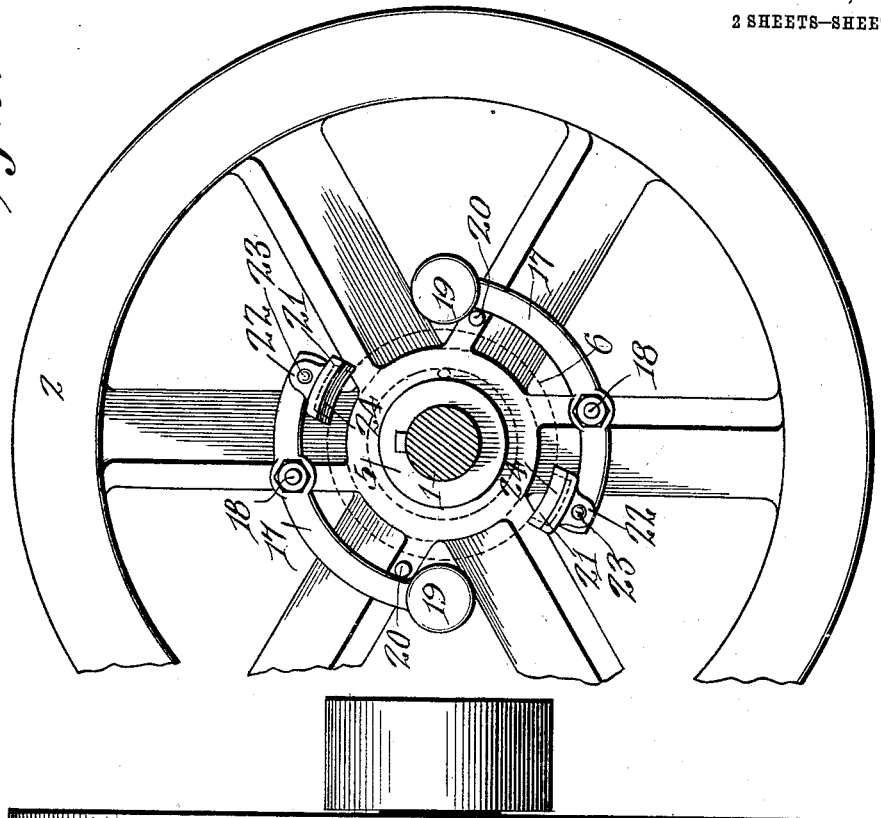
WITNESSES
Howard P. Orr.
F. T. Chapman
L. R. O'Neill, INVENTOR
BY
E. G. Siggers
ATTORNEY

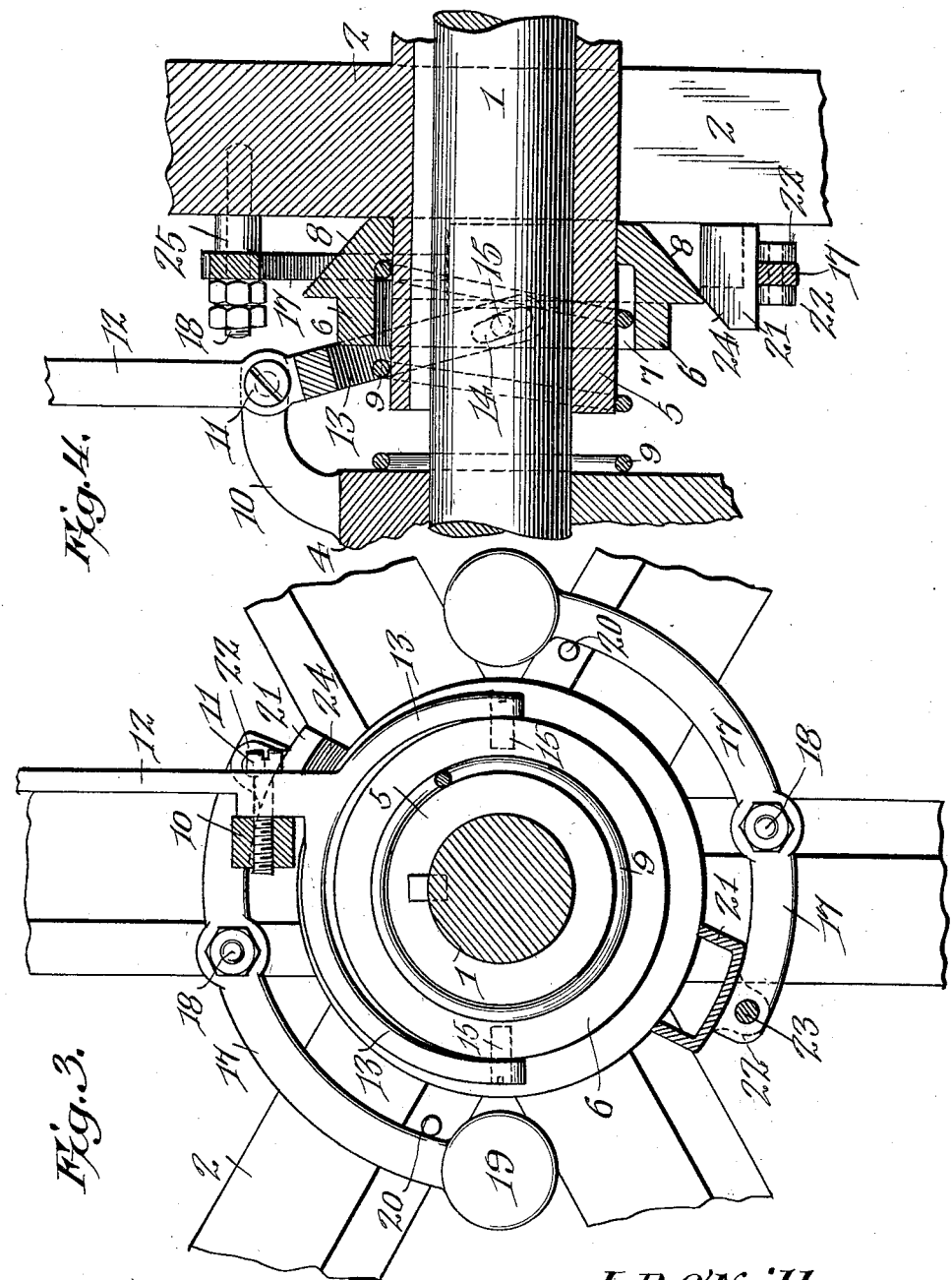

UNITED STATES PATENT OFFICE.

LEWIS RILEY O'NEILL, OF MONTCLAIR, NEW JERSEY.

GOVERNOR.

1,005,570.  Specification of Letters Patent.  Patented Oct. 10, 1911.

Application filed September 6, 1910. Serial No. 580,583.

*To all whom it may concern:*

Be it known that I, LEWIS R. O'NEILL, a citizen of the United States, residing at Montclair, in the county of Essex and State of New Jersey, have invented a new and useful Governor for Gasolene-Engines, of which the following is a specification.

This invention has reference to improvements in governors for explosion engines, and is designed more particularly for the regulation of the explosive charge for the engine, whereby the charge may be varied in accordance with the load and thereby the engine be kept at a practically constant speed.

In accordance with the present invention there is applied to the power shaft of the engine a sleeve, and to the wheel, or to one of the wheels of a two wheeled engine, centrifugal members adapted to coöperate with the sleeve on the shaft to move the same against the action of a spring until the force tending to actuate the centrifugal members shall equal the force of the spring when the engine is running at a predetermined speed under load.

In accordance with the present invention the centrifugal members act on the sleeve through inclined planes so that the action is at all times constant irrespective of the speed developed and the sleeve provides a means whereby the controlling means of the carbureter of the engine may have a greater range of movement than is customary in governors of the type to which this invention relates.

The invention will be best understood from a consideration of the following detailed description taken in connection with the accompanying drawings forming a part of this specification, with the understanding, however, that while the showing of the drawings is that of an operative structure, various modifications in the structure and changes in the location of parts are within the scope of the present invention, so long as the salient points of the said invention are retained.

In the drawings:—Figure 1 is an elevation of a portion of an explosion engine with the invention applied. Fig. 2 is a section on the line 2—2 of Fig. 1 with the sleeve omitted but indicated in dotted lines. Fig. 3 is a section on the line 3—3 of Fig. 1 but drawn to a larger scale, with one of the actuating shoes also shown in section. Fig. 4 is a vertical axial section of the structure of Fig. 3 with some parts shown in elevation.

Referring to the drawings, there is shown a shaft 1 and a fly wheel 2, which may be taken as indicative of any suitable type of explosion engine, the particular character of the engine not entering into the present invention. There is also shown in Fig. 1 and in part indicated in Fig. 4, one of the pedestals 3 of the engine carrying a journal bearing 4 for the shaft 1. The fly wheel 2 is provided with a hub 5 as is customary, and in accordance with the present invention there is mounted on this hub a sleeve 6 provided with an interior annular channel 7 opening at one end of the sleeve, while the other end of the sleeve is enlarged axially and formed with a beveled or conical face 8. In the particular arrangement shown in the drawings, this sleeve does not participate in the rotative movement of the wheel and is constantly urged toward the wheel by a spring 9, one end of which is housed in the channel 7 and the other end abuts against the journal bearing 4. Carried by the cap member of the journal bearing is an arm 10 to which is pivotally secured by a screw 11 or otherwise, a lever 12, the short arm of which is formed into a yoke 13 in straddling relation to the sleeve 6 and provided at its ends with slots 14 to receive pins 15 at diametrically opposite points of the sleeve 6, which latter may be of reduced diameter immediately back of the beveled portion 8 to accommodate the yoke 13. The longer arm of the lever 12 is connected by a link 16 to the parts to be controlled, which in the present instance may be considered as the carbureter structure of the engine. When the sleeve 6 is in engagement with the wheel 2, this being the full extent of the movement of the sleeve under the action of the spring 9, the carbureter is assumed to be in position to supply the full charge to the engine to drive the same under the largest load the engine is designed to carry. When the sleeve 6 is moved against the spring 9 to compress the same, the lever 12 is moved by the sleeve in a direction to cause the carbureter to cut down the charge and thereby decrease the impelling power tending to drive the engine.

Mounted on the wheel 2 at diametrically opposite points are levers 17, each secured to a respective spoke of the wheel by a bolt 18 or otherwise. One end of each lever 17 is provided with a weight 19 of appropriate size, and a stop pin 20 determines the movement of the lever 17 in one direction, this stop pin being carried by an appropriate portion of the wheel 2. The arm of the lever 17 remote from the weight 19, and this arm may be the shorter arm of the lever, carries a shoe 21, which shoe may be made hollow to decrease its weight and is provided with spaced ears 22 between which the short arm of the lever 17 projects and to which it is connected by a pin 23. One side of the shoe 21 is provided with a beveled face 24 matching the beveled face 8 of the sleeve 6, and the shoe may be curved in conformity with the curvature of the sleeve 6.

It is desirable that each lever 17 should be spaced a short distance from the spoke carrying it and for this reason the bolt 18 may have applied thereto a spacing sleeve 25 lodged between the wheel spoke and the lever 17.

While the engine is quiescent the spring 9 forces the sleeve 6 against the wheel 2 and tends to move the shoes 21 outward from the axis of rotation of the wheel by the reactive effect of the beveled face 8 on the beveled faces 24 of the shoes 21. The extent of this movement is limited by the pins 20, so that the shoes 21 are always in engagement with the beveled face 8 of the sleeve 6 and are retained thereby in proper position for active movement. Now, when the engine is running the wheels 2 rotate in an appropriate direction and the centrifugal force thereby generated acts on the weights 19 of the lever 17 and tends to cause a movement of these weighted ends of the levers from the periphery of the wheel 2, this force being resisted by the re-active effect of the spring 9 together with such frictional resistance as may be encountered. Ultimately the speed of the engine rises to an extent where the spring 9 is no longer able to resist the action of centrifugal force on the weights 19, and the shoes 21 are moved inward toward the shaft 1 and since the shoes 21 are held against movement in the direction of the length of the shaft by engagement with the spokes of the wheel, the sleeve 6 will yield to the inward movement of the shoes 21, thereby compressing the spring 9 and this movement of the sleeve 6 is communicated to the carbureter through the yoke 13, lever 12 and link 16, and such other mechanism as may be necessary, but which is not shown in the drawings. The increase in speed in the engine beyond the predetermined point thus cuts down the fuel supply until equilibrium is established between the load and the engine speed and so long as the conditions remain constant the speed of the engine under the load considered remains constant. Should the load be reduced, the speed of the engine will, of course, increase, but this increase in speed immediately reacts by the centrifugal governor on the sleeve 6 to move the lever 12 to reduce the fuel and the engine will again slow down. Should the load increase instead of decreasing, the resultant slowing down of the engine will cause the weighted ends of the lever 17 to approach the axis of rotation of the wheels to an extent permitting the spring 9 to move the sleeve 6 correspondingly toward the wheel 2 and this will result in operating the carbureter to increase the charge and thereby increase the power applied to the engine, so that the speed is again increased. By this means the speed of the engine is maintained constant irrespective of the variations in load, the term constant speed being used in the commonly accepted meaning that the speed does not vary beyond the narrow limits necessary in the operation of the governor.

Because of the beveled shoes acting against the beveled sleeve or collar 6, the rate of movement of the lever 12 is uniform throughout the entire range of travel of the sleeve or collar, and the link 16 and parts controlled thereby will have a like uniform movement.

By the arrangement of the sleeve or collar on the hub of the wheel with the motion of the centrifugal members imparted thereto through the beveled surfaces of the shoes and sleeve or collar, it is possible to use a much larger and more flexible spring than with other types of governors, so that the action of the spring is more nearly uniform throughout its range than would otherwise be the case.

What is claimed is:—

1. In an explosion engine provided with a wheel having a hub thereon, a sleeve or collar on the hub and provided with a circumferential beveled face directed toward the wheel, transmitting mechanism connected to the beveled sleeve or collar and holding the same against rotation, a spring in engagement with the sleeve or collar at the end thereof remote from the beveled face, centrifugal members mounted on the wheel of the engine, and a beveled shoe on each centrifugal member having its beveled portion in operative relation to the beveled face of the sleeve or collar.

2. In an explosion engine provided with a wheel having a hub thereon, a sleeve or collar on the hub and provided with a circumferential beveled face directed toward the wheel, transmitting mechanism connected to the beveled sleeve or collar and holding the same against rotation, a spring in engagement with the sleeve or collar at the end thereof remote from the beveled face, centrifugal members mounted on the wheel of the engine, a beveled shoe on each centrifugal member having its beveled portion in operative relation to the beveled face of the sleeve or collar, and means for limiting the movement of the centrifugal members toward the inactive position to prevent the disengagement of the shoes from the sleeve or collar.

3. In an explosion engine provided with a wheel having a hub thereon, a sleeve or collar movable along the hub in the direction of the axis of rotation of the wheel, said collar having one end provided with a peripheral beveled face and the other end carrying diametrically opposed pins, a lever having at one end a yoke embracing the sleeve and connected thereto by the pins, said lever having a pivoted support on a fixed portion of the engine, means connected to the lever at the end remote from the yoke for transmitting motion therefrom, a spring acting on the sleeve or collar to move it toward the wheel, and levers pivotally connected to the wheel on opposite sides of the axis thereof, each lever having on one side of its pivot support a weight and on the other side a shoe with a beveled surface matching the beveled face of the sleeve, the shoes being in operative relation to the sleeve or collar.

4. In an explosion engine having a wheel with a hub, a sleeve or collar mounted on said hub and capable of moving axially therealong, said sleeve or collar being formed at one end with a peripheral beveled face and at the other end with an interior annular channel, a spring having one end seated in the channel and the other end engaging a fixed portion of the engine, a lever pivoted to a fixed portion of the engine and provided at one end with a yoke straddling the sleeve or collar, diametrically opposed pins carried by the sleeve or collar and engaging the ends of the yoke portion of the lever, a connection at the other end of the lever for coupling the same to the means to be controlled, diametrically opposed levers pivoted on the wheel, each lever having a weighted end and at the other end carrying a shoe pivoted thereto and having a beveled face conforming to the beveled face of the sleeve or collar, and spokes on the wheel in the path of each lever for maintaining the beveled shoe carried by the lever in operative relation to the beveled face of the sleeve or collar.

5. In an explosion engine provided with a shaft and a wheel thereon, a sleeve or collar in concentric relation to the shaft and movable toward and from the engine wheel, said sleeve or collar having a beveled portion presented toward the engine wheel, transmitting mechanism directly connected to the sleeve or collar for movement therewith and holding the said sleeve or collar against rotation, centrifugal members carried by the wheel on opposite sides of the axis of rotation thereof and movable with said wheel, said centrifugal members having beveled shoes for engaging the beveled portion of the sleeve or collar to move the latter away from the wheel, and a single spring engaging the sleeve or collar to move the latter and the portion of the transmitting mechanism connected thereto toward the wheel in opposition to the action of the centrifugal members on said sleeve or collar.

In testimony, that I claim the foregoing as my own, I have hereto affixed my signature in the presence of two witnesses.

LEWIS RILEY O'NEILL.

Witnesses:
  CHAS. H. NEAL,
  JOHN N. HINKE.

Copies of this patent may be obtained for five cents each, by addressing the "Commissioner of Patents, Washington, D. C."